United States Patent
Sawai et al.

[11] Patent Number: 5,975,787
[45] Date of Patent: Nov. 2, 1999

[54] DEVICE FOR SECURING A PART TO A CHASSIS

[75] Inventors: Kunio Sawai; Hiroshi Hamahata; Shigeru Kaneko; Katsunori Onishi, all of Osaka, Japan

[73] Assignee: Funai Electric Co., Ltd., Osaka, Japan

[21] Appl. No.: 08/974,776

[22] Filed: Nov. 20, 1997

[30] Foreign Application Priority Data

Nov. 27, 1996 [JP] Japan .................................. 8-315783

[51] Int. Cl.[6] ............................ B29C 53/84; B60R 21/20
[52] U.S. Cl. ............................. 403/268; 403/2; 403/12; 403/269; 292/210; 411/2; 286/187
[58] Field of Search ................... 226/187; 242/354; 403/265, 266, 268, 269, 12, 2, 11, 374.5, 322.4, 321; 292/210, 203, DIG. 53; 411/2

[56] References Cited

U.S. PATENT DOCUMENTS

| | | | |
|---|---|---|---|
| 4,370,874 | 2/1983 | Munn | 292/210 X |
| 4,436,969 | 3/1984 | Motoki | 200/38 R |
| 4,983,439 | 1/1991 | Saito | 428/64 |
| 5,134,608 | 7/1992 | Strickler et al. | 369/215 |
| 5,295,405 | 3/1994 | Gumbert et al. | 74/99 |
| 5,492,360 | 2/1996 | Logeman | 411/2 X |
| 5,535,958 | 7/1996 | Kammler et al. | 242/358 |
| 5,842,809 | 12/1998 | Hwang et al. | 403/263 |

Primary Examiner—Lynne H. Browne
Assistant Examiner—John R. Cottingham
Attorney, Agent, or Firm—Lackenbach Siegel Marzullo Aronson Greenspan, P.C.

[57] ABSTRACT

A device for securing a pinch roller support arm to a chassis of a magnetic tape apparatus. In the device, the chassis includes a round hole which is formed such that it extends through the chassis, and a securing part is outsert molded in the chassis in such a manner that the securing part extends through the round hole. After the pinch roller support arm is fitted with a support shaft provided on and projected from the chassis and a projection provided on the pinch roller support arm is fitted into a fitting hole formed in the chassis, by rotating the securing part around the round hole, the securing part is engaged with the projection.

5 Claims, 5 Drawing Sheets

DEVICE FOR SECURING A PART TO A CHASSIS

BACKGROUND OF THE INVENTION

1. Field of the Invention

The present invention relates to a device for securing a part to a chassis and, in particular, to a device for securing a pinch roller support arm to a chassis of a magnetic tape apparatus.

2. Description of the Related Art

Here, description will be given below of an example of a conventional magnetic tape apparatus with reference to FIG. 6. In particular, in FIG. 6, reference numeral 1 designates a tape cassette which includes a supply reel 1a and a take-up reel 1b; 2, movable tape guide posts which are used to draw out a magnetic tape T from the tape cassette 1 and wind it onto a head cylinder 3; 4, a full erase head; 5, an audio erase head; 6, an audio/control head; 7, fixed tape guide posts; 8, a back tension post; 9, a capstan; and 10, a pinch roller support mechanism which includes a support arm 12 pivotally and rotatably supported on a support shaft 11, while a pinch roller 13 is pivotally mounted on one end portion of the support arm 12 and a cam pin 14 provided on the other end portion of the support arm 12 is fitted into a cam groove 15a formed in a rotary cam 15. Further, reference numeral 16 designates positioning projections which are respectively provided in a tape cassette placement position on a chassis 17.

In the above-mentioned conventional structure, to record and reproduce, the tape cassette 1 is fitted with the positioning projections 16 to thereby fix the tape cassette 1 at the tape cassette placement position on the chassis 17; after then, the magnetic tape T is drawn out from the tape cassette 1 and wound around the head cylinder 3 using the movable tape guide posts 2 and, at the same time, by rotating the rotary cam 15 by a given angle, the support arm 12 is rotated, so that the pinch roller 13 is pressed against the capstan 9 through the magnetic tape T, and by driving to rotate the capstan 9, the magnetic tape T is caused to run.

The support arm 12, as shown in FIGS. 7 and 8, includes a main arm portion 12a which is formed in a substantial U shape by sheet metal bending working, and an auxiliary arm portion 12b assembled in the main arm portion 12a. The pinch roller 13 is pivotally and rotatably mounted on the leading end portion of the main arm portion 12a, the cam pin 14 is projectingly provided on the leading end portion of the auxiliary arm portion 12b, through-holes 18 and 19 respectively formed in the main arm portion 12a and auxiliary arm portion 12b concentrically therewith are rotatably fitted with the support shaft 11, and the both end portions of a spring 20, which is assembled in the auxiliary arm portion 12b and is fitted with the outside of the support shaft 11, are respectively engaged with the main arm portion 12a and auxiliary arm portion 12b, so that the pinch roller 13 can be energized toward the capstan 9.

Conventionally, the support shaft 11 is secured to the chassis 17 by a nut 21 which can be threadedly engaged with the lower end portion of the support shaft 11, while a removal preventive washer 22 is fitted into a groove 11a which is formed in the upper end portion of the support shaft 11.

In the above-mentioned conventional structure, in order to prevent the support arm 12 from being removed from the support shaft 11, the removal preventive washer 22 is fitted into the groove 11a formed in the upper end portion of the support shaft 11. However, with use of this structure, the number of parts increases by an amount corresponding to the use of the removal preventive washer 22. Also, as described above, the groove 11a is formed in the support shaft 11 and the removal preventive washer 22 is fitted into the groove 11a to thereby secure the support arm 12 to the chassis 17. However, this securing operation takes time and labor, resulting in the increased production cost.

SUMMARY OF THE INVENTION

The present invention aims at eliminating the drawbacks found in the above-mentioned conventional device for securing a part to a chassis. Accordingly, it is an object of the invention to provide a device for securing a part to a chassis which is able to carry out a securing operation with ease without increasing the number of parts.

In attaining the above object, according to the invention, there is provided a part securing device comprising: a chassis including a round hole formed therein so that it extends through the chassis; a securing part outsert molded in the chassis so as to extend through the round hole; and a part to be secured which is removably provided on the chassis, wherein the securing part is rotated around the round hole so that the securing part is engaged with the part to be secured to thereby secure the part to the chassis.

DETAILED DESCRIPTION OF THE PREFERRED EMBODIMENT

Figure 1:
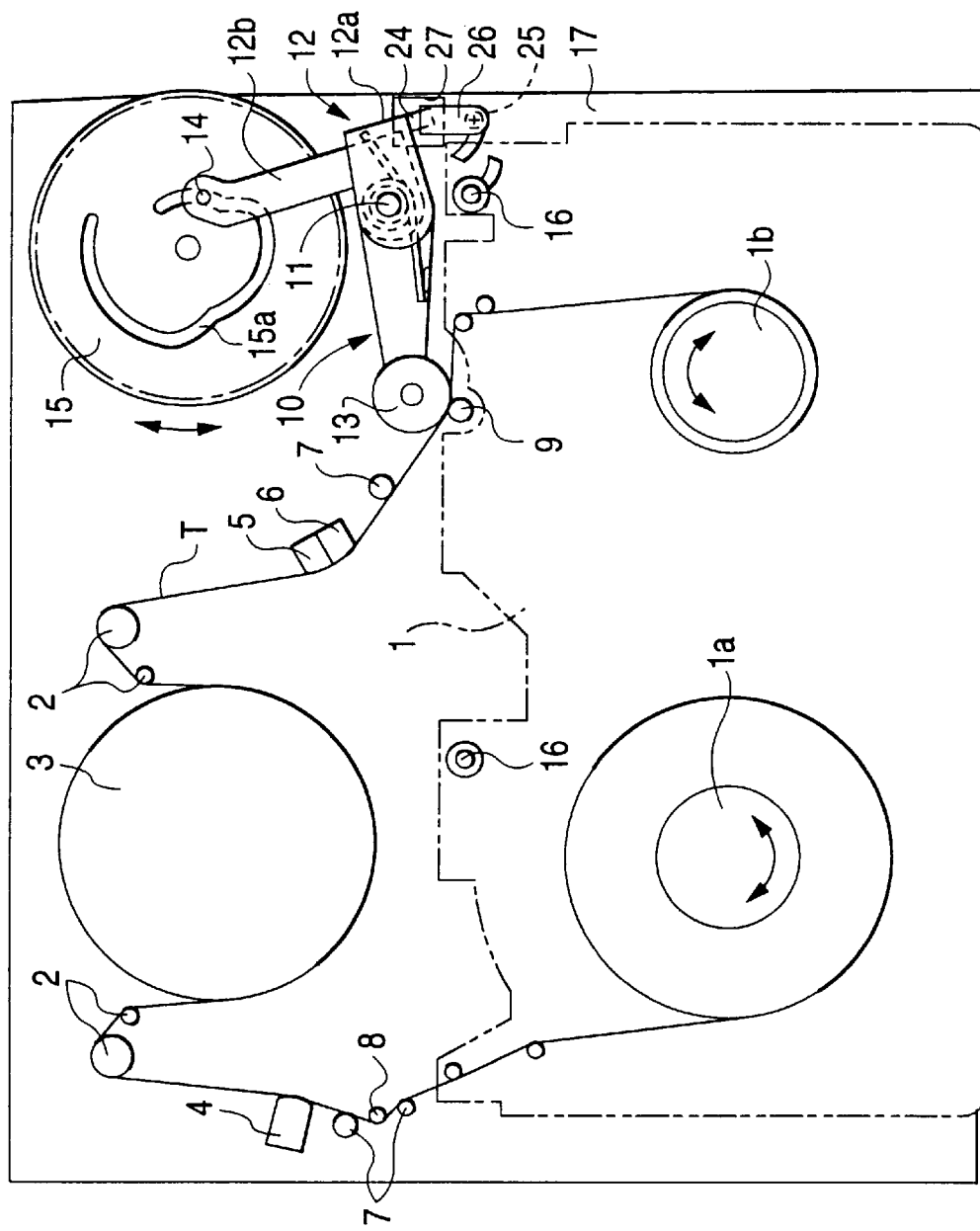
FIG. 1 is a schematic plan view of a magnetic tape apparatus according to an embodiment of the invention.
Figure 6:
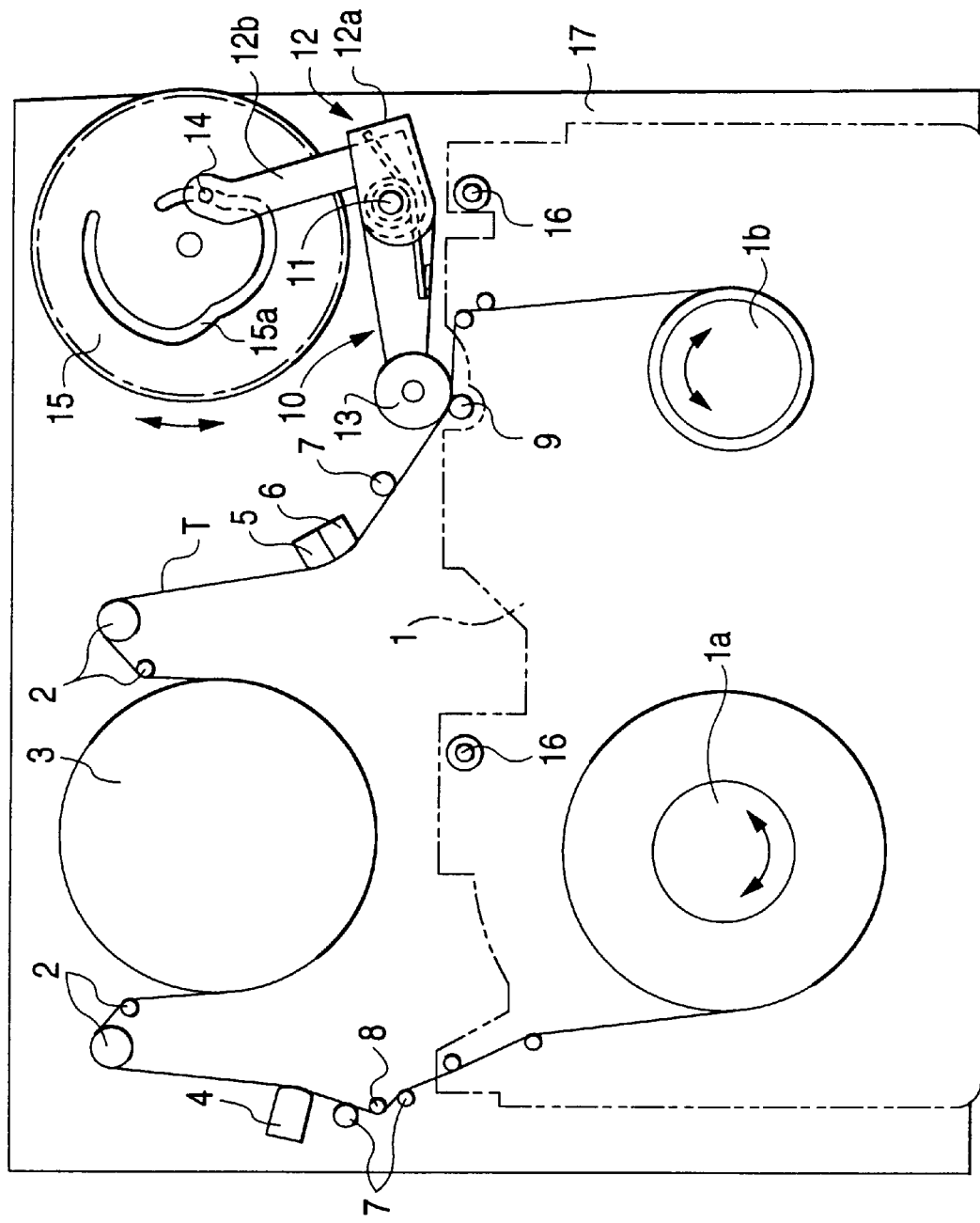
FIG. 6 is a schematic plan view of a conventional magnetic tape apparatus.
Figure 7:
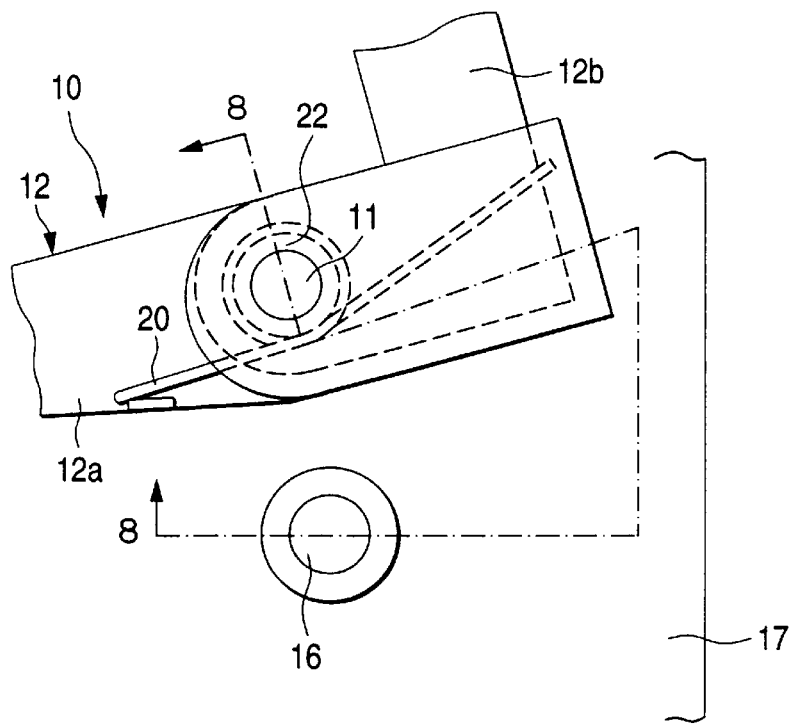
FIG. 7 is a plan view of the neighborhood of a support arm for a pinch roller employed in the conventional magnetic tape apparatus.
Figure 8:
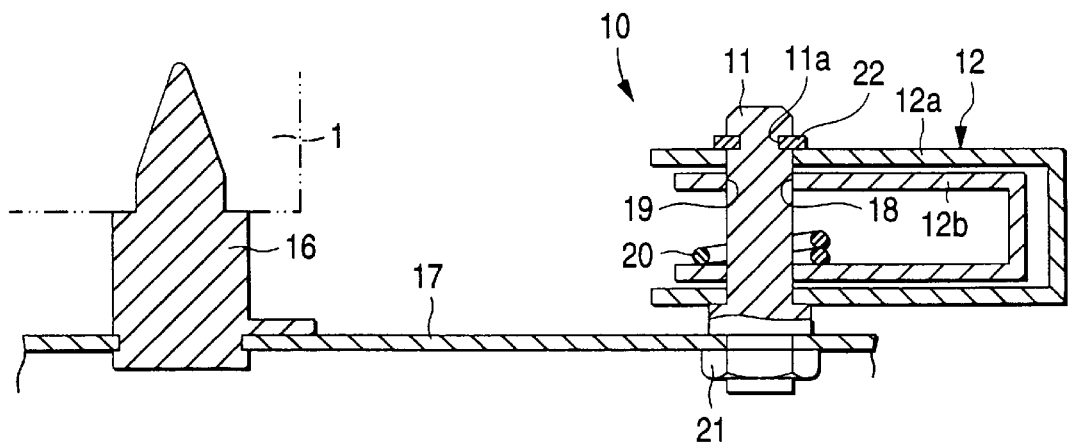
FIG. 8 is a section view, taken along the line C—C shown in FIG. 7.

Now, description will be given below of a preferred embodiment of the invention with reference to the accompanying drawings. In particular, FIGS. 1 to 3 respectively show a magnetic tape apparatus which is an embodiment of the invention, in which a support arm (a part to be secured) 12 for a pinch roller includes a projection 24, a chassis 17 includes a round hole 25 which is formed in such a manner that it is positioned adjacent to the projection 24 and extends through the chassis 17, and a securing part 26 is outsert molded in the chassis 17 through the round hole 25. The other remaining components of the present structure than the above components, which are similar to those employed in the conventional structure shown in FIGS. 6 to 8, are given the same designations and thus the description thereof is omitted here.

Figure 2:
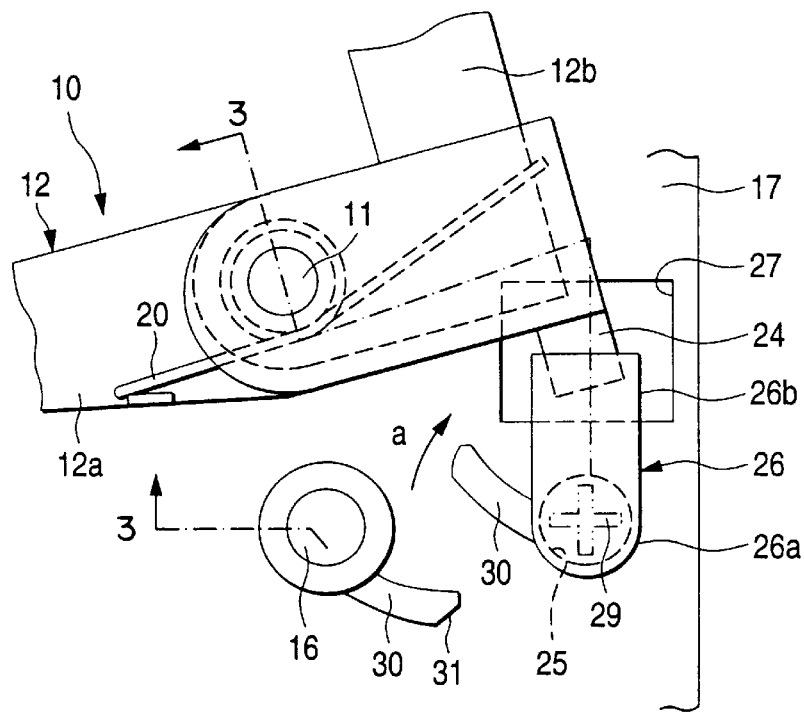
FIG. 2 is a plan view of the neighborhood of a support arm for a pinch roller employed in the embodiment.
Figure 3:
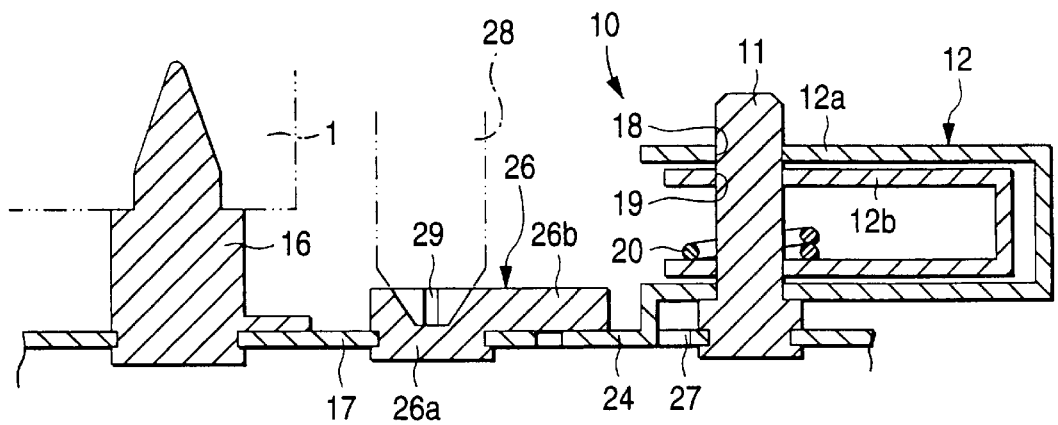
FIG. 3 is a section view, taken along the line A—A shown in FIG. 2.

The above projection 24, as shown in FIGS. 2 and 3, has a substantial L shape and is provided on the rear end portion of a main arm portion 12a, while a fitting hole 27 is formed in the chassis 17 in such a manner that it is opposed to the projection 24.

The above securing part 26 is formed of an outsert molded synthetic resin member and, as shown in FIGS. 2 and 3, it includes a shaft portion 26a to be fitted with the round hole 25 and a securing piece portion 26b extending from the shaft portion 26a along the chassis 17 outwardly in the diametrical direction thereof, while there is formed on the upper surface of the shaft portion 26a an engaging groove 29 which is used for engagement of a driver 28 with the securing part 26.

Figure 4:
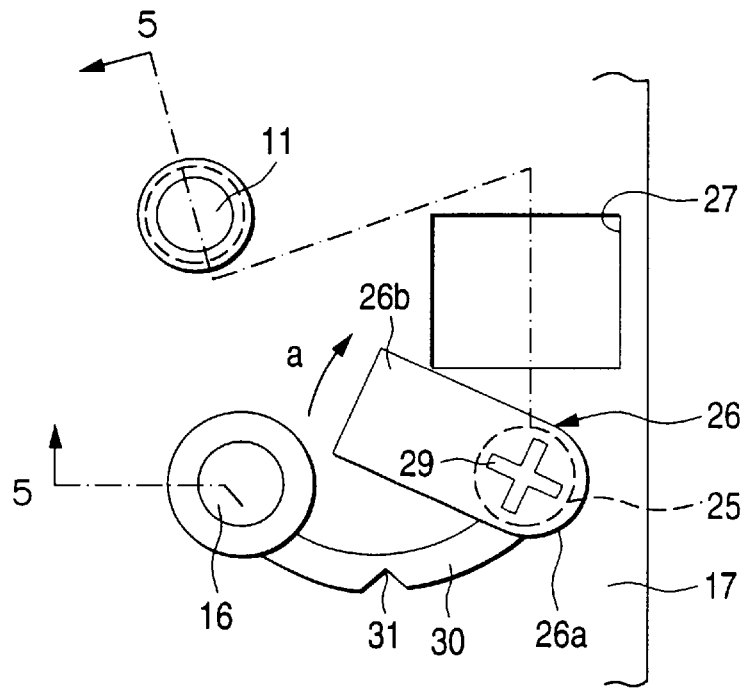
FIG. 4 is a plan view of the embodiment, showing a state thereof in which a securing part is outsert molded.
Figure 5:
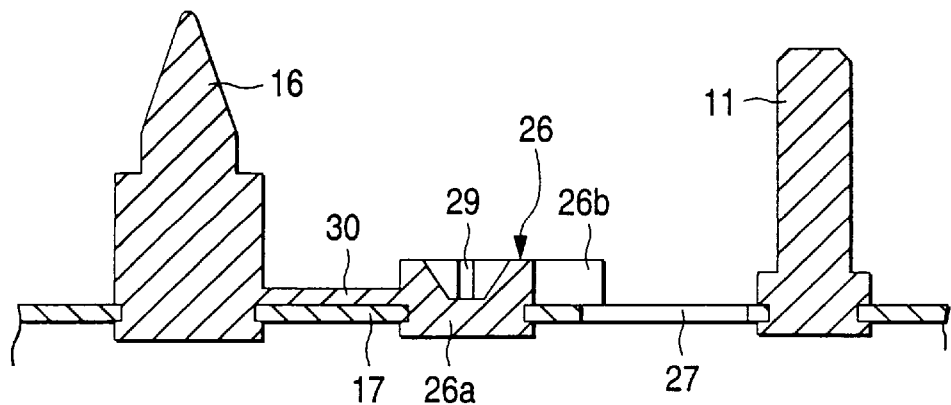
FIG. 5 is a section view, taken along the line B—B shown in FIG. 4.

When outsert molding the securing part 26 together with any one or more of various parts such as a positioning projection 16 and the like, there has been previously formed a reduced-width portion in part of a resin inflow passage which connects a recessed portion for the securing part 26 formed in a molding die (not shown) and a recessed portion for the positioning projection 16 similarly formed in the same molding die. Due to this, as shown in FIGS. 4 and 5, at the same time when the securing part 26 and the positioning projection 16 are outsert molded, a notch portion 31 can be formed by the above reduced-width portion in a connecting piece 30 which is outsert molded between the securing part 26 and the positioning projection 16 by the above resin inflow passage. Further, simply by rotating the securing part 26 in a direction of an arrow a from the state thereof shown in FIG. 4, the portion of the connecting piece 30 in which the notch portion 31 is formed can be broken easily by the rotation force of the securing part 26 (see FIG. 2).

In the above-mentioned structure, after the through-holes 18 and 19 of the main arm portion 12a and auxiliary arm portion 12b are brought into fit with the support shaft 11 so as to fit the projection 24 into the fitting hole 27, and the leading end of the driver 28 is brought into engagement with the engaging groove 29, if the securing part 26 is simply rotated in the above-mentioned arrow a direction, the portion of the notch portion 31 of the connecting piece 30 can be broken and thus the securing part 26 can be engaged with the projection 24, which makes it possible to prevent the support arm 12 from being removed from the support shaft 11 (see FIGS. 2 and 3). By the way, since the shaft portion 26a of the securing part 26 is pressed against the upper and lower surfaces of the chassis 17 due to contraction of the synthetic resin material after the above-mentioned outsert molding, it is possible to keep surely a state in which the securing part 26 is in engagement with the projection 24.

In this case, if, at the same time when various parts are outsert molded together in the chassis 17, the securing part 26 is also outsert molded, then the number of parts is kept from increasing and thus the production cost can be reduced. Also, simply by rotating the securing part 26 around the round hole 25 of the chassis 17 to thereby bring the securing part 26 into engagement with the projection 24, the support arm 12 can be prevented from being removed from the support shaft 11.

The support shaft 11 is formed of synthetic resin and, if the support shaft is outsert molded at the same time when various parts are outsert molded together in the chassis 17, the number of parts can be decreased and thus the production cost can be reduced.

According to the invention, due to the fact that, at the same time when various parts are outsert molded together in the chassis, the securing part is also outsert molded, the number of parts is kept from increasing as well as the manufacturing cost can be reduced. Also, simply by rotating the securing part around the round hole of the chassis to thereby bring the securing part into engagement with the part to be secured, the part to be secured can be secured to the chassis easily.

What is claimed is:

1. A part securing device comprising:

a chassis including a round hole formed therein so that it extends through said chassis;

a securing part outsert molded in said chassis so as to extend through said round hole;

a part to be secured removably provided on said chassis, wherein said securing part is rotated around said round hole so that said securing part is engaged with said part to be secured to thereby secure said part to said chassis, and wherein said securing part includes an engaging groove for engaging a driver with said securing part in such a manner that said driver can be arranged substantially concentrically with said round hole of said chassis.

2. A part securing device comprising:

a chassis including a round hole formed therein so that it extends through said chassis;

a securing part outsert molded in said chassis so as to extend through said round hole;

a part to be secured removably provided on said chassis, said securing part outsert molded in said chassis integrally with another part, and a notch portion is formed in a connecting piece for outsert molding which is used to connect said securing part with said another part, wherein said securing part is rotated around said round hole so that said securing part is engaged with said part to be secured to thereby secure said part to said chassis, and wherein when said securing part is rotated, a portion of said connecting piece at which said notch portion is formed is broken due to a rotation force of said securing part.

3. The part securing device as set forth in claim 1, wherein said part to be secured consists of a support arm for a pinch roller used in a magnetic tape apparatus, and said support arm includes a projection, and wherein after said support arm is removably fitted with a support shaft provided on and projected from said chassis, if said securing part is rotated, then said securing part is engaged with said projection.

4. The part securing device as set forth in claim 3, wherein said support shaft is outsert molded in said chassis.

5. A part securing device comprising:

a chassis including a round hole formed therein so that it extends through said chassis;

a securing part outsert molded in said chassis so as to extend throughout said round hole;

a part to be secured removably provided on said chassis, wherein said securing part is rotated around said round hole so that said securing part is engaged with said part to be secured to thereby secure said part to said chassis; and said part to be secured consists of a support arm for a pinch roller used in a magnetic tape apparatus, and said support arm includes a projection, and wherein after said support arm is removably fitted with a support shaft provided on and projected from said chassis, if said securing part is rotated, then said securing part is engaged with said projection; and wherein a fitting hole into which said projection is fitted is formed in said chassis.

* * * * *